United States Patent
Ueda et al.

(10) Patent No.: US 11,999,842 B2
(45) Date of Patent: *Jun. 4, 2024

(54) THERMOPLASTIC RESIN COMPOSITION COMPRISING A FLUORORESIN AND A CROSSLINKED FLUOROELASTOMER AND METHOD FOR PRODUCING THE SAME

(71) Applicant: DAIKIN INDUSTRIES, LTD., Osaka (JP)

(72) Inventors: Akinori Ueda, Osaka (JP); Tsuyoshi Ono, Osaka (JP); Katsusada Tokuhira, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 907 days.

This patent is subject to a terminal disclaimer.

(21) Appl. No.: 16/975,972

(22) PCT Filed: Feb. 26, 2019

(86) PCT No.: PCT/JP2019/007348
§ 371 (c)(1),
(2) Date: Aug. 26, 2020

(87) PCT Pub. No.: WO2019/167954
PCT Pub. Date: Sep. 6, 2019

(65) Prior Publication Data
US 2021/0040302 A1 Feb. 11, 2021

(30) Foreign Application Priority Data

Feb. 28, 2018 (JP) ................... 2018-034987

(51) Int. Cl.
| | | |
|---|---|---|
| C08L 27/18 | (2006.01) | |
| B32B 1/08 | (2006.01) | |
| B32B 25/08 | (2006.01) | |
| B32B 27/30 | (2006.01) | |
| B32B 27/32 | (2006.01) | |
| C08J 3/24 | (2006.01) | |
| C08K 5/18 | (2006.01) | |
| C08K 5/19 | (2006.01) | |
| C08K 5/3465 | (2006.01) | |
| C08K 5/50 | (2006.01) | |
| C08L 27/06 | (2006.01) | |
| C08L 27/16 | (2006.01) | |
| C08L 27/20 | (2006.01) | |
| C08L 27/22 | (2006.01) | |
| C08K 3/22 | (2006.01) | |

(52) U.S. Cl.
CPC ............. *C08L 27/16* (2013.01); *B32B 1/08* (2013.01); *B32B 25/08* (2013.01); *B32B 27/304* (2013.01); *B32B 27/322* (2013.01); *C08J 3/24* (2013.01); *C08K 5/18* (2013.01); *C08K 5/3465* (2013.01); *C08K 5/50* (2013.01); *C08L 27/06* (2013.01); *C08L 27/18* (2013.01); *C08L 27/20* (2013.01); *C08L 27/22* (2013.01); *B32B 2250/02* (2013.01); *B32B 2597/00* (2013.01); *C08J 2327/18* (2013.01); *C08K 2003/222* (2013.01); *C08L 2203/18* (2013.01); *C08L 2205/02* (2013.01); *C08L 2312/00* (2013.01)

(58) Field of Classification Search
None
See application file for complete search history.

(56) References Cited

U.S. PATENT DOCUMENTS

2021/0301118 A1* 9/2021 Ueda .................. F16J 15/102

FOREIGN PATENT DOCUMENTS

| JP | 2011-012212 A | 1/2011 |
|---|---|---|
| JP | 2011-116004 A | 6/2011 |
| WO | 2007/116876 A1 | 10/2007 |
| WO | 2008/139967 A1 | 11/2008 |
| WO | 2009/020182 A1 | 2/2009 |

OTHER PUBLICATIONS

International Preliminary Report on Patentability dated Sep. 1, 2020 with translation of the Written Opinion from the International Bureau in International Application No. PCT/JP2019/007348.
Extended European Search Reported dated Oct. 20, 2021 in corresponding Application No. 19761158.5.

* cited by examiner

*Primary Examiner* — David J Buttner
(74) *Attorney, Agent, or Firm* — Sughrue Mion, PLLC

(57) ABSTRACT

A thermoplastic resin composition including a fluororesin (A) and a crosslinked fluoroelastomer (B), wherein the fluororesin (A) is a copolymer that contains a chlorotrifluoroethylene unit and a tetrafluoroethylene unit and that has at least one functional group selected from a carbonyl group, an olefinic group and an amino group at a main chain terminal or side chain terminal of the polymer. The crosslinked fluoroelastomer (B) is obtained by subjecting a fluoroelastomer (b) to a dynamic crosslinking treatment along with a polyamine compound (c) having a thermal decomposition temperature of 210° C. or higher and a crosslinking accelerator (d) in the presence of the fluororesin (A) under conditions for melting the fluororesin (A). Also disclosed is a method for producing the thermoplastic composition, a molded article formed from the thermoplastic composition, and a laminated product including a resin layer formed from the thermoplastic composition.

10 Claims, No Drawings

THERMOPLASTIC RESIN COMPOSITION COMPRISING A FLUORORESIN AND A CROSSLINKED FLUOROELASTOMER AND METHOD FOR PRODUCING THE SAME

CROSS REFERENCE TO RELATED APPLICATIONS

This application is a National Stage of International Application No. PCT/JP2019/007348 filed Feb. 26, 2019, claiming priority based on Japanese Patent Application No. 2018-034987 filed Feb. 28, 2018.

TECHNICAL FIELD

The present disclosure relates to a thermoplastic resin composition and a method for producing the same, a molded article, a laminated product, and a hose or tube for fuel.

BACKGROUND ART

The development of thermoplastic resin compositions that achieve both barrier properties against fuel and flexibility, as well as excellent adhesiveness to other materials, has been advanced. For example, Patent Document 1 proposes a thermoplastic resin composition comprising a fluororesin (A) and a crosslinked fluoroelastomer (B), wherein the fluororesin (A) is a copolymer that has a carbonyl group, an olefinic group or an amino group at a main chain terminal or side chain terminal of the polymer, and wherein the crosslinked fluoroelastomer (B) is obtained by subjecting a fluoroelastomer (b) to a dynamic crosslinking treatment along with a cross-linking agent (c) in the presence of the fluororesin (A) under conditions for melting the fluororesin (A).

RELATED ART

Patent Documents

Patent Document 1: International Publication No. WO 2009/020182

SUMMARY OF THE INVENTION

Problem to be Solved by the Invention

An object of the present disclosure is to provide a thermoplastic resin composition that has further excellent barrier properties against fuel and adhesiveness to an elastomer layer compared to the conventional technology.

Means for Solving the Problem

According to the present disclosure, provided is a thermoplastic resin composition comprising a fluororesin (A) and a crosslinked fluoroelastomer (B), wherein the fluororesin (A) is a copolymer that contains a chlorotrifluoroethylene unit and a tetrafluoroethylene unit and that has at least one functional group selected from the group consisting of a carbonyl group, an olefinic group and an amino group at a main chain terminal or side chain terminal of the polymer, and wherein the crosslinked fluoroelastomer (B) is obtained by subjecting a fluoroelastomer (b) to a dynamic crosslinking treatment along with a polyamine compound (c) having a thermal decomposition temperature of 210° C. or higher and a crosslinking accelerator (d) in the presence of the fluororesin (A) under conditions for melting the fluororesin (A).

It is preferable that the fluoroelastomer (b) should be a vinylidene fluoride/tetrafluoroethylene/hexafluoropropylene-based fluoroelastomer.

In addition, according to the present disclosure, provided is a thermoplastic resin composition comprising a fluororesin (A) and a crosslinked fluoroelastomer (B), wherein the fluororesin (A) is a copolymer that contains a chlorotrifluoroethylene unit and a tetrafluoroethylene unit, wherein, when a molded article formed from the thermoplastic resin composition is subjected to an infrared absorption spectrum analysis, a ratio [K1] of a height of an absorption peak exhibited at 3,451 $cm^{-1}$ to a height of an absorption peak exhibited at 2,360 $cm^{-1}$ is 0.001 or more and a ratio [K2] of a height of an absorption peak exhibited at 1,722 $cm^{-1}$ to a height of an absorption peak exhibited at 3,035 $cm^{-1}$ is 0.3 or more, and wherein a fuel permeability coefficient is 1.5 $(g \cdot mm)/(m^2 \cdot day)$ or less.

In addition, according to the present disclosure, provided is a method for producing the thermoplastic resin composition described above, comprising: subjecting the fluoroelastomer (b) to the dynamic crosslinking treatment along with the polyamine compound (c) having a thermal decomposition temperature of 210° C. or higher and the crosslinking accelerator (d) in the presence of the fluororesin (A) under conditions for melting the fluororesin (A).

In addition, according to the present disclosure, provided is a molded article formed from the thermoplastic resin composition described above.

In addition, according to the present disclosure, provided is a laminated product comprising a thermoplastic resin layer (W) formed from the thermoplastic resin composition described above and an elastomer layer (X) formed from an elastomer composition.

It is preferable that the elastomer composition should contain at least one elastomer selected from the group consisting of an acrylonitrile-butadiene rubber, a hydrogenated acrylonitrile-butadiene rubber, a blend rubber between an acrylonitrile-butadiene rubber and a polyvinyl chloride, a blend rubber between an acrylonitrile-butadiene rubber and an acrylic rubber, a chlorinated polyethylene, a fluoroelastomer, an epichlorohydrin rubber, an ethylene-propylene rubber, a chlorosulfonated polyethylene rubber, a silicone rubber and an acrylic rubber.

It is preferable that the elastomer composition should contain at least one compound selected from the group consisting of an onium salt, an amine compound and an epoxy resin.

In addition, according to the present disclosure, provided is a hose or tube for fuel, comprising the molded article described above or the laminated product described above.

Effects of Invention

According to the present disclosure, a thermoplastic resin composition that has excellent barrier properties against fuel and adhesiveness to an elastomer layer can be provided.

DESCRIPTION OF EMBODIMENTS

Hereinafter, specific embodiments of the present disclosure will be described in detail, but the present disclosure is not limited to the following embodiments.

A thermoplastic resin composition of the present disclosure comprises a fluororesin (A) and a crosslinked fluoroelastomer (B), In a thermoplastic resin composition according to one embodiment of the present disclosure, the crosslinked fluoroelastomer (B) is obtained by subjecting a fluoroelastomer (b) to a dynamic crosslinking treatment along with a polyamine compound (c) having a thermal decomposition temperature of 210° C. or higher and a crosslinking accelerator (d) in the presence of the fluororesin (A) under conditions for melting the fluororesin (A). As described above, by using a particular polyamine compound in the dynamic crosslinking treatment, a thermoplastic resin composition that has excellent barrier properties against fuel and adhesiveness to an elastomer layer is obtained.

In addition, the thermoplastic resin composition according to one embodiment of the present disclosure can also be characterized by that, when a molded article formed from a thermoplastic resin composition comprising a fluororesin (A) and a crosslinked fluoroelastomer (B) is subjected to an infrared absorption spectrum analysis, the ratio [K1] of the height of an absorption peak exhibited at 3,451 $cm^{-1}$ to the height of an absorption peak exhibited at 2,360 $cm^{-1}$ is 0.001 or more and the ratio [K2] of the height of an absorption peak exhibited at 1,722 $cm^{-1}$ to the height of an absorption peak exhibited at 3,035 $cm^{-1}$ is 0.3 or more, and that the fuel permeability coefficient is 1.5 (g·mm)/($m^2$·day) or less. When the thermoplastic resin composition of the present disclosure exhibits characteristic absorption peaks as described above, the thermoplastic resin composition has excellent barrier properties against fuel and adhesiveness to an elastomer layer.

The ratio [K1] is preferably 0.003 or more and further preferably 0.005 or more, and although the upper limit thereof is not limited, it is normally 1.500 or less. The ratio [K2] is preferably 0.4 or more and further preferably 0.5 or more, and although the upper limit thereof is not limited, it is normally 5.0 or less.

The ratio [K1] and the ratio [K2] are calculated according to the following method. The thermoplastic resin composition is placed in a metal mold with a diameter of 120 mm, set in a press machine that has been heated to 300° C., and subjected to melt pressing at a pressure of about 2.9 MPa, thereby fabricating a thermoplastic resin sheet. For this thermoplastic resin sheet, the infrared absorption spectrum is measured by the transmission method using a Fourier transform infrared spectrophotometer [FT-IR], and the ratio [K1] and the ratio [K2] are calculated according to the following equations.

Ratio [$K1$]=$H1a/H1b$

Ratio [$K2$]=$H2a/H2b$

H1a: the absorbance height at 3,451 $cm^{-1}$ from a straight line obtained by connecting absorbance at 3,475 $cm^{-1}$ and absorbance at 3,415 $cm^{-1}$ as the baseline H1b: the absorbance height at 2,360 $cm^{-1}$ from a straight line obtained by connecting each absorbance at 2,680 $cm^{-1}$ and 2,030 $cm^{-1}$ as the baseline H2a: the absorbance height at 1,722 $cm^{-1}$ from a straight line obtained by connecting each absorbance at 1,760 $cm^{-1}$ and 1,660 $cm^{-1}$ as the baseline H2b: the absorbance height at 3,035 $cm^{-1}$ from a straight line obtained by connecting each absorbance at 3,170 $cm^{-1}$ and 2,900 $cm^{-1}$ as the baseline The above-described thermoplastic resin composition exhibiting characteristic absorption peaks can be preferably produced by subjecting a fluoroelastomer (b) to a dynamic crosslinking treatment along with a polyamine compound (c) having a thermal decomposition temperature of 210° C. or higher and a crosslinking accelerator (d) in the presence of the fluororesin (A) under conditions for melting the fluororesin (A), thereby obtaining the crosslinked fluoroelastomer (B). From the type of the bonds assigned to the respective absorption peaks, it is believed that a larger ratio [K1] means more crosslinked structures formed by the reaction between the functional group that the fluororesin (A) has and the polyamine compound (c), and that a larger ratio [K2] means more double bonds formed in the main chain of the fluoroelastomer (b) and more crosslinked structures formed through the reaction between the formed double bonds and the polyamine compound (c). In short, it is considered that the crosslinking density in the thermoplastic resin composition can be estimated from the ratio [K1] and the ratio [K2]. Regardless of the validity of such an estimation, the thermoplastic resin composition according to one embodiment of the present disclosure has excellent barrier properties against fuel and adhesiveness to an elastomer layer since the ratio [K1] and the ratio [K2] are in the ranges described above.

The fuel permeability coefficient described above is preferably 1.4 (g·mm)/($m^2$·day) or less and more preferably 1.3 (g·mm)/($m^2$·day) or less. Although the lower limit of the fuel permeability coefficient described above is not limited, for example, it may be 0.1 (g·mm)/($m^2$·day) or more.

The fuel permeability coefficient described above can be measured according to the following method. The thermoplastic resin composition is placed in a metal mold with a diameter of 120 mm, set in a press machine that has been heated to 300° C., and subjected to melt pressing at a pressure of about 2.9 MPa, thereby fabricating a thermoplastic resin sheet. In a container made of SUS having a volume of 20 mL (opening area: $1.26 \times 10^{-3}$ $m^2$), 18 mL of CE10 (toluene/isooctane/ethanol=45/45/10% by volume), which is a simulant fuel, is placed, and the thermoplastic resin sheet is set at the opening of the container to seal it, thereby creating a test piece. The test piece is placed in a thermostat (60° C.), the weight of the test piece is measured, and when the weight reduction per unit time becomes constant, the fuel permeability coefficient is determined according to the following equation.

$$\text{Fuel Permeability Coefficient } ((g \cdot mm)/(m^2 \cdot day)) = \frac{[\text{Weight Reduction (g)}] \times [\text{Sheet Thickness (mm)}]}{[\text{Opening Area } 1.26 \times 10^{-3} (m^2)] \times [\text{Measurement Interval (day)}]}$$

In addition, it is preferable that the thermoplastic resin composition of the present disclosure should have a dispersed structure in which the crosslinked fluoroelastomer (B) is dispersed in the fluororesin (A) and that the mean dispersion particle size of the crosslinked fluoroelastomer (B) should be 5 μm or less. When the crosslinked fluoroelastomer (B) is finely and homogeneously dispersed in the fluororesin (A) in this manner, the thermoplastic resin composition of the present disclosure is even more excellent in barrier properties against fuel.

The mean dispersion particle size described above is preferably 2 μm or less and more preferably 1 μm or less, and although the lower limit is not limited, it may be 0.01 μm or more, for example.

The mean dispersion particle size described above is determined by: obtaining an image using any of an atomic force microscope (AFM), a scanning electron microscope (SEM) and a transmission electron microscope (TEM) or using a combination thereof; analyzing the image with an image analysis software "Image)"; selecting 20 arbitrary particles in the dispersed phase to obtain the equivalent circle diameter for each of them, thereby calculating the mean value thereof. For example, when an AFM is used, the difference obtained from the surface information of the continuous phase fluororesin (A) and the dispersed phase crosslinked fluoroelastomer (B) is obtained as a light and dark image. Alternatively, when a SEM is used, the particle size of the crosslinked elastomer in the dispersed phase can be read in the same manner as in the case of AFM by emphasizing contrast with respect to an image obtained as a backscattered electron image or a secondary electron image such that the crosslinked fluoroelastomer (B) in the dispersed phase becomes clear, or by performing adjustment of light and darkness or both in the image. Similarly to the SEM, in the case of TEM as well, the particle size of the crosslinked elastomer in the dispersed phase can be read by performing, on the obtained image, adjustment of the contrast, light and darkness or both of the image as in the AFM and SEM. Any of the above may be selected depending on easiness to check for each thermoplastic polymer composition.

In the thermoplastic resin composition of the present disclosure, it is preferable that the mass ratio between the fluororesin (A) and the fluoroelastomer (b) (fluororesin (A)/fluoroelastomer (b)) should be preferably 70/30 to 96/4 because a thermoplastic resin composition that has even more excellent barrier properties against fuel and adhesiveness to an elastomer layer and that also has excellent heat resistance and flexibility is obtained. If the amount of the fluororesin (A) is too small, the barrier properties against fuel may be insufficient, and if the amount thereof is too large, the flexibility and the adhesiveness to an elastomer layer may be insufficient. The mass ratio between the fluororesin (A) and the fluoroelastomer (b) (fluororesin (A)/fluoroelastomer (b)) is more preferably 72/28 to 91/9 and further preferably 75/25 to 87/13.

In the thermoplastic resin composition of the present disclosure, it is preferable that the mass ratio between the fluororesin (A) and the crosslinked fluoroelastomer (B) (fluororesin (A)/crosslinked fluoroelastomer (B)) should be 70/30 to 95/5 because a thermoplastic resin composition that has even more excellent barrier properties against fuel and adhesiveness to an elastomer layer and that also has excellent heat resistance and flexibility is obtained. If the amount of the fluororesin (A) is too small, the barrier properties against fuel may be insufficient, and if the amount thereof is too large, the flexibility and the adhesiveness to an elastomer layer may be insufficient. The mass ratio between the fluororesin (A) and the crosslinked fluoroelastomer (B) (fluororesin (A)/crosslinked fluoroelastomer (B)) is more preferably 72/28 to 90/10 and further preferably 75/25 to 85/15.

In the present disclosure, the mass ratio between the fluororesin (A) and the crosslinked fluoroelastomer (B) in the thermoplastic resin composition can be calculated from, for example, the ratio between the mass of the fluororesin (A) used for preparing the thermoplastic resin composition and the total mass of the fluoroelastomer (b), the polyamine compound (c) and the crosslinking accelerator (d) used for preparing the thermoplastic resin composition.

In the thermoplastic resin composition of the present disclosure, it is preferable that the volume ratio between the fluororesin (A) and the fluoroelastomer (b) (fluororesin (A)/fluoroelastomer (b)) should be 68/32 to 95/5 because a thermoplastic resin composition that has even more excellent barrier properties against fuel and adhesiveness to an elastomer layer and that also has excellent heat resistance and flexibility is obtained. If the amount of the fluororesin (A) is too small, the barrier properties against fuel may be insufficient, and if the amount thereof is too large, the flexibility and the adhesiveness to an elastomer layer may be insufficient. The volume ratio between the fluororesin (A) and the fluoroelastomer (b) (fluororesin (A)/fluoroelastomer (b)) is more preferably 70/30 to 90/10 and further preferably 73/27 to 85/15.

In the thermoplastic resin composition of the present disclosure, it is preferable that the volume ratio between the fluororesin (A) and the crosslinked fluoroelastomer (B) (fluororesin (A)/crosslinked fluoroelastomer (B)) should be 66/34 to 95/5 because a thermoplastic resin composition that has even more excellent barrier properties against fuel and adhesiveness to an elastomer layer and that also has excellent heat resistance and flexibility is obtained. If the amount of the fluororesin (A) is too small, the barrier properties against fuel may be insufficient, and if the amount thereof is too large, the flexibility and the adhesiveness to an elastomer layer may be insufficient. The volume ratio between the fluororesin (A) and the crosslinked fluoroelastomer (B) (fluororesin (A)/crosslinked fluoroelastomer (B)) is more preferably 68/32 to 89/11 and further preferably 71/29 to 84/16.

In the present disclosure, the volume ratio between the fluororesin (A) and the crosslinked fluoroelastomer (B) in the thermoplastic resin composition can be calculated from, for example, the ratio between a value obtained by dividing the mass of the fluororesin (A) used for preparing the thermoplastic resin composition by the specific gravity thereof, and the total of a value obtained by dividing the mass of the fluoroelastomer (b) by the specific gravity thereof, a value obtained by dividing the mass of the polyamine compound (c) by the specific gravity thereof and a value obtained by dividing the mass of the crosslinking accelerator (d) by the specific gravity thereof. In addition, in the thermoplastic resin composition of the present disclosure, when the crosslinked fluoroelastomer (B) is isotropically and homogeneously dispersed in the fluororesin (A), the volume ratio between the fluororesin (A) and the crosslinked fluoroelastomer (B) can also be calculated by calculating the area ratio between the continuous phase fluororesin (A) and the dispersed phase crosslinked fluoroelastomer (B) from an image obtained by using any of an atomic force microscope (AFM), a scanning electron microscope (SEM) and a transmission electron microscope (TEM) or using a combination thereof, and by raising the area ratio to the 1.5-th power.

Fluororesin (A)

The fluororesin (A) is a copolymer that contains a chlorotrifluoroethylene (CTFE) unit and a tetrafluoroethylene (TFE) unit.

The content of the CTFE unit in the fluororesin (A) is preferably 10 to 90 mol %, more preferably 15 to 60 mol %, and further preferably 18 to 40 mol % based on the entire monomer units because a thermoplastic resin composition that has even more excellent barrier properties against fuel and adhesiveness to an elastomer layer and that also has excellent heat resistance is obtained. If the amount of the CTFE unit is too small, the barrier properties against fuel may be insufficient, and if the amount thereof is too large, the heat resistance may be insufficient. On the other hand, the content of the TFE unit in the fluororesin (A) is preferably 10 to 90 mol %, more preferably 40 to 85 mol %, and further preferably 60 to 82 mol % based on the entire monomer units because a thermoplastic resin composition that has even more excellent barrier properties against fuel and adhesiveness to an elastomer layer and that also has excellent heat resistance is obtained. If the amount of the TFE unit is too small, the heat resistance may be insufficient, and if the amount thereof is too large, the barrier properties against fuel may be insufficient.

The ratio between the CTFE unit content and the TFE unit content in the fluororesin (A) is preferably 10/90 to 90/10, more preferably 15/85 to 60/40, and further preferably 18/82 to 40/60 in a molar ratio because a thermoplastic resin composition that has even more excellent barrier properties against fuel and adhesiveness to an elastomer layer and that also has excellent heat resistance is obtained.

The fluororesin (A) preferably contains the CTFE unit, the TFE unit, and a monomer ($\alpha$) unit derived from a monomer ($\alpha$) that is copolymerizable with CTFE and TFE because a thermoplastic resin composition that has even more excellent barrier properties against fuel and adhesiveness to an elastomer layer and that also has excellent heat resistance and crack resistance is obtained.

The monomer ($\alpha$) is not limited as long as it is a monomer that is copolymerizable with CTFE and TFE, and examples thereof include ethylene, vinylidene fluoride (VdF), a perfluoro(alkyl vinyl ether) (PAVE) represented by $CF_2=CF-ORf^1$, wherein $Rf^1$ is a perfluoroalkyl group having 1 to 8 carbon atoms, a vinyl monomer represented by $CX^1X^2=CX^3(CF_2)_nX^4$, wherein $X^1$, $X^2$ and $X^3$ are the same as or different from each other and are each a hydrogen atom or a fluorine atom; $X^4$ is a hydrogen atom, a fluorine atom or a chlorine atom; and n is an integer of 1 to 10, and an alkyl perfluorovinyl ether derivative represented by $CF_2=CF-OCH_2-Rf^2$, wherein $Rf^2$ is a perfluoroalkyl group having 1 to 5 carbon atoms. Among the above, at least one selected from the group consisting of the PAVE, the vinyl monomer described above and the alkyl perfluorovinyl ether derivative is preferable, and at least one selected from the group consisting of the PAVE and hexafluoropropylene (HFP) is more preferable.

It is preferable that the above PAVE should be a perfluoro (alkyl vinyl ether) represented by $CF_2=CF-ORf^3$, wherein $Rf^3$ represents a perfluoroalkyl group having 1 to 5 carbon atoms, and examples thereof include perfluoro(methyl vinyl ether) (PMVE), perfluoro(ethyl vinyl ether) (PEVE), perfluoro(propyl vinyl ether) (PPVE) and perfluoro(butyl vinyl ether). Among the above, at least one selected from the group consisting of PMVE, PEVE and PPVE is preferable.

The above alkyl perfluorovinyl ether derivative is preferably an alkyl perfluorovinyl ether derivative, wherein $Rf^2$ is a perfluoroalkyl group having 1 to 3 carbon atoms, and is more preferably $CF_2=CF-OCH_2-CF_2CF_3$.

In the fluororesin (A), the total content of the CTFE unit and the TFE unit is preferably 90 to 99.9 mol % and more preferably 95 to 99.5 mol % and the content of the monomer ($\alpha$) unit is preferably 0.1 to 10 mol % and more preferably 0.5 to 5 mol % based on the entire monomer units, because a thermoplastic resin composition that has even more excellent barrier properties against fuel and adhesiveness to an elastomer layer and that also has excellent heat resistance and crack resistance is obtained. If the amount of the monomer ($\alpha$) unit is too small, the moldability and crack resistance may be insufficient, and if the amount thereof is too large, the barrier properties against fuel and heat resistance may be insufficient.

The content of each monomer unit in the fluororesin (A) mentioned above can be calculated by appropriately combining NMR, FT-IR, elemental analysis and X-ray fluorescence analysis depending on the type of monomer.

The melting point of the fluororesin (A) is preferably 150 to 340° C., more preferably 215 to 290° C., further preferably 225 to 280° C., and particularly preferably 235 to 260° C. because a thermoplastic resin composition that has even more excellent barrier properties against fuel and adhesiveness to an elastomer layer and that also has excellent heat resistance is obtained. The melting point is a temperature corresponding to the melting peak upon increasing the temperature at a rate of 10° C/min using a differential scanning calorimeter [DSC]. If the melting point is too low, the heat resistance may be insufficient, and if the melting point is too high, the molding temperature may become higher and a part of the polyamine compound (c) may be decomposed to cause molding failure.

It is preferable that the melt flow rate (MFR) of the fluororesin (A) should be 0.01 to 100 g/10 min. The MFR is obtained by measuring the mass (g) of a polymer flowing out from the nozzle with a diameter of 2 mm and a length of 8 mm per unit time (10 minutes) under a load of 5 kg at 297° C., using a melt indexer (manufactured by Toyo Seiki Seisaku-sho, Ltd.).

In addition, the fluororesin (A) is a copolymer that has at least one functional group selected from the group consisting of a carbonyl group, an olefinic group and an amino group at a main chain terminal or side chain terminal of the polymer.

The carbonyl group described above is a functional group having $-C(=O)-$.

Specific examples thereof may include the followings:
a carbonate group [$-O-C(=O)-OR^3$, wherein $R^3$ is an alkyl group having 1 to 20 carbon atoms or an alkyl group having 2 to 20 carbon atoms and containing an ether binding oxygen atom];
a haloformyl group [$-C(=O)X^3$, wherein $X^5$ is a halogen atom];
a formyl group [$-C(=O)H$];
a group represented by the formula: $-R^4-C(=O)-R^3$, wherein $R^4$ is a divalent organic group having 1 to 20 carbon atoms and $R^5$ is a monovalent organic group having 1 to 20 carbon atoms;
a group represented by the formula: $-O-C(=O)-R^6$, wherein $R^6$ is an alkyl group having 1 to 20 carbon atoms or an alkyl group having 2 to 20 carbon atoms and containing an ether binding oxygen atom;
a carboxyl group [$-C(=O)OH$];
an alkoxycarbonyl group [$-C(=O)OR^7$, wherein $R^7$ is a monovalent organic group having 1 to 20 carbon atoms];
a carbamoyl group [$-C(=O)NR^8R^9$, wherein $R^8$ and $R^9$ may be the same as or different from each other and are each a hydrogen atom or a monovalent organic group having 1 to 20 carbon atoms];
an acid anhydride bond [$-C(=O)-O-C(=O)-$]; and
an isocyanate group [$-N=C=O$].

Specific examples of $R^3$ include a methyl group, an ethyl group, a propyl group, an isopropyl group and a butyl group. Specific examples of the $R^4$ described above include a methylene group, a $-CF2-$ group and a $-C_6H_4-$ group, and specific examples of $R^5$ include a methyl group, an ethyl group, a propyl group, an isopropyl group and a butyl group.

Specific examples of $R^7$ include a methyl group, an ethyl group, a propyl group, an isopropyl group and a butyl group. In addition, specific examples of $R^8$ and $R^9$ include a hydrogen atom, a methyl group, an ethyl group, a propyl group, an isopropyl group, a butyl group and a phenyl group.

Among these carbonyl groups, at least one selected from the group consisting of the carboxyl group, the haloformyl group, the alkoxycarbonyl group and the carbonate group is preferable and at least one selected from the group consisting of —COOH, —OC(=O)OCH$_2$CH$_2$CH$_3$, —COF and —OC(=O)OCH(CH$_3$)$_2$ is more preferable, in view of obtaining a thermoplastic resin composition that has even more excellent adhesiveness to an elastomer layer and easiness of introduction to the fluororesin.

The olefinic group is a functional group that has a carbon-carbon double bond. Examples of the olefinic group include a functional group represented by the following formula:

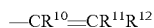

$$-CR^{10}=CR^{11}R^{12}$$

wherein $R^{10}$, $R^{11}$ and $R^{12}$ may be the same as or different from each other and are each a hydrogen atom, a fluorine atom or a monovalent organic group having 1 to 20 carbon atoms, and at least one selected from the group consisting of —CF=CF$_2$, —CH=CF$_2$, —CF=CHF, —CF=CH$_2$ and —CH=CH$_2$ is preferable.

The amino group is a monovalent functional group obtained by removing hydrogen from ammonia, or a primary or secondary amine. Examples of the amino group include a functional group represented by the following formula:

$$-NR^{12}R^{14}$$

wherein $R^{13}$ and $R^{14}$ may be the same as or different from each other and are each a hydrogen atom or a monovalent organic group having 1 to 20 carbon atoms, and at least one selected from the group consisting of -NH2, -NH(CH3), -N(CH3) 2, -NH (CH2CH3) , -N (C2Hs) 2 and -NH (C6Hs) is preferable.

The number of functional groups of the fluororesin (A) can be measured by the infrared absorption spectrum analysis, and for example, can be measured by the methods described in Japanese Patent Publication No. 37-3127 and International Publication No. WO 99/45044. When a film sheet of the fluororesin (A) is subjected to the infrared absorption spectrum analysis using an infrared spectrophotometer to measure the number of its functional groups from the absorption band of the frequency peculiar to each functional group, for example, the —COF terminal can be calculated from the absorption band at 1,884 cm$^{-1}$, the —COOH terminal from the absorption bands at 1,813 cm$^{-1}$ and 1,775 cm$^{-1}$, the —COOCH$_3$ terminal from the absorption band at 1,795 cm$^{-1}$, the —CONH$_2$ terminal from the absorption band at 3,438 cm$^{-1}$, the —CH$_2$OH terminal from the absorption band at 3,648 cm$^{-1}$, the —CF=CF$_2$ terminal from the absorption band at 1,790 cm$^{-1}$, and the terminal containing the carbonate group [—OC(=O)O—] from the absorption band at 1,810 to 1,815 cm$^{-1}$. The absorbance of the peak exhibited in each absorption band can be measured by, for example, automatically determining the baseline of the obtained infrared absorption spectrum using Perkin-Elmer Spectrum for windows Ver. 1.4C.

Although the method for introducing the functional groups described above to the fluororesin is not limited, examples thereof may include a method in which a monomer having the above functional groups is copolymerized upon polymerization of the fluororesin, a method in which polymerization is carried out using a polymerization initiator having the above functional groups or functional groups that can be converted into the above functional groups, a method in which the above functional groups are introduced to the fluororesin through the polymer reaction, a method in which the polymer main chain is thermally decomposed under the coexistence of oxygen, and a method in which the terminal of the fluororesin is converted using an apparatus that can apply strong shear force, such as a twin screw extruder.

Examples of the monomer having the above functional groups include an aliphatic unsaturated carboxylic acid, such as (meth)acrylic acid, crotonic acid, maleic acid, maleic anhydride, fumaric acid, itaconic acid, itaconic anhydride, citraconic acid, citraconic anhydride, mesaconic acid, mesaconic anhydride, aconitic acid and aconitic anhydride.

The number of the above functional groups of the fluororesin (A) is preferably 20 to 5,000, more preferably 30 to 4,000, and further preferably 40 to 3,000 per one million carbon atoms constituting the fluororesin (A), in view of obtaining a thermoplastic resin composition that has even more excellent adhesiveness to an elastomer layer and avoindance of foaming upon molding.

The fluororesin (A) having the above functional groups, which is to be used in the present disclosure, is not limited to one composed of only molecules each having the above functional group at either one terminal or both terminals of the main chain or at a side chain in one polymer, and it may also be a mixture of molecules each having the above functional group at either one terminal or both terminals of the main chain or at a side chain of the polymer and molecules not containing the above functional groups.

Crosslinked Fluoroelastomer (B)

It is preferable that the crosslinked fluoroelastomer (B) should be obtained by subjecting a fluoroelastomer (b) to a dynamic crosslinking treatment along with a polyamine compound (c) having a thermal decomposition temperature of 210° C. or higher and a crosslinking accelerator (d) in the presence of the fluororesin (A) under conditions for melting the fluororesin (A).

Subjecting the fluoroelastomer (b) to a dynamic crosslinking treatment refers to dynamically crosslinking an uncrosslinked fluoroelastomer (b) simultaneously with melt kneading using a Banbury mixer, a pressurizing kneader, an extruder or the like. Among the above, an extruder such as twin screw extruder is preferable in that high shear force can be applied. Through the dynamic crosslinking treatment, the phase structure of the fluororesin (A) and the crosslinked fluoroelastomer (B) can be controlled.

The crosslinking treatment under melting conditions means that the crosslinking treatment is performed at a temperature of the melting point of the fluororesin (A) or higher. The temperature of the crosslinking treatment is preferably the melting point of the fluororesin (A) or higher, more preferably 330° C. or lower, and further preferably 320° C. or lower. As long as it is a temperature of the melting point of the fluororesin (A) or higher, the temperature of the crosslinking treatment may be 150° C. or higher, but it is preferably 220° C. or higher and more preferably 260° C. or higher. By setting the temperature of kneading to the range described above, the fluororesin (A) and the crosslinked fluoroelastomer (B) can be sufficiently kneaded while thermal degradation of the uncrosslinked fluoroelastomer (b) can be suppressed.

In the thermoplastic resin composition of the present disclosure, the crosslinked fluoroelastomer (B) is obtained by carrying out the dynamic crosslinking along with a particular polyamine compound (c), and therefore, even when the dynamic crosslinking is carried out at a relatively high temperature as described above, the crosslinking of the uncrosslinked fluoroelastomer (b) proceeds sufficiently and also the fluororesin (A) and the crosslinked fluoroelastomer (B) are sufficiently dispersed in each other.

In the thermoplastic resin composition of the present disclosure, the fluororesin (A) may form a continuous phase while the crosslinked fluoroelastomer (B) may form a dispersed phase, or the fluororesin (A) and the crosslinked fluoroelastomer (B) may form a co-continuous phase structure; however, it is preferable that the fluororesin (A) should form a continuous phase while the crosslinked fluoroelastomer (B) forms a dispersed phase. A co-continuous phase structure of the fluororesin (A) and the crosslinked fluoroelastomer (B) may be included in a part of the structure in which the fluororesin (A) forms a continuous phase while the crosslinked fluoroelastomer (B) forms a dispersed phase.

Even if the uncrosslinked fluoroelastomer (b) forms a matrix in a dispersion at first, the crosslinked fluoroelastomer (B) will form a dispersed phase or the fluororesin (A) and the crosslinked fluoroelastomer (B) will form a co-continuous phase structure as the uncrosslinked fluoroelastomer (b) is changed into the crosslinked fluoroelastomer (B) due to the crosslinking reaction. This is because the crosslinked fluoroelastomer (B) has a higher melt viscosity than the uncrosslinked fluoroelastomer (b).

The crosslinked fluoroelastomer (B) is obtained by crosslinking the uncrosslinked fluoroelastomer (b).

The fluoroelastomer (b) is preferably at least one selected from the group consisting of a perfluoroelastomer, a partially fluorinated elastomer and a fluorine containing thermoplastic elastomer, and it is more preferably a partially fluorinated elastomer.

It is preferable that the fluoroelastomer (b) should have, for example, a Mooney viscosity ML (1+10) of 10 to 100. The above Mooney viscosity ML (1+10) can be measured in accordance with ASTM D-1646 at 121° C. using a Mooney viscometer, Model MV2000E manufactured by Alpha Technologies.

Examples of the fluoroelastomer (b) include a VdF-based fluoroelastomer, a TFE/propylene-based fluoroelastomer, a TFE/propylene/VdF-based fluoroelastomer, an ethylene/HFP-based fluoroelastomer, an ethylene/HFP/VdF-based fluoroelastomer and an ethylene/HFP/TFE-based fluoroelastomer. Among the above, it is preferably at least one selected from the group consisting of a VdF-based fluoroelastomer and a TFE/propylene-based fluoroelastomer, and it is more preferably a VdF/TFE/HFP-based fluoroelastomer.

It is preferable that the above VdF-based fluoroelastomer should be a copolymer composed of 20 to 85 mol % of VdF and 80 to 15 mol % of at least one other monomer that is copolymerizable with VdF. More preferably, it is a copolymer composed of 25 to 80 mol % of VdF and 75 to 20 mol % of at least one other monomer that is copolymerizable with VdF.

Examples of the above at least one other monomer that is copolymerizable with VdF include a monomer such as TFE, HFP, a fluoroalkyl vinyl ether, CTFE, trifluoroethylene, trifluoropropylene, pentafluoropropylene, trifluorobutene, tetrafluoroisobutene, hexafluoroisobutene, vinyl fluoride, a fluoromonomer represented by the general formula (1): $CH_2=CFRf^{11}$, wherein $Rf^{11}$ is a linear or branched fluoroalkyl group having 1 to 12 carbon atoms, a fluoromonomer represented by the general formula (2): $CH_2=CH-(CF_2)_n-X^{21}$, wherein $X^{21}$ is H or F and n is an integer of 3 to 10, and a monomer providing a crosslinking site; and a non-fluorinated monomer such as ethylene, propylene and an alkyl vinyl ether. These monomers may each be used singly, or may be used in arbitrary combination. Among the above, at least one selected from the group consisting of TFE, HFP, a fluoroalkyl vinyl ether and CTFE is preferable. As the fluoroalkyl vinyl ether, a perfluoro(alkyl vinyl ether) represented by $CF_2=CF-ORf^4$, wherein $Rf^4$ represents a perfluoroalkyl group having 1 to 5 carbon atoms, is preferable.

Examples of the monomer providing a crosslinking site include an iodine or bromine containing monomer represented by the general formula (3):

$$CX^6_2=CX^6-Rf_5CHR^{31}X^{31} \quad (3)$$

wherein $X^6$ may be the same or different and is a hydrogen atom, a fluorine atom or $-CH_3$, $Rf^5$ is a fluoroalkylene group, a perfluoroalkylene group, a fluoropolyoxyalkylene group or a perfluoropolyoxyalkylene group, $R^{31}$ is a hydrogen atom or $-CH_3$, and $X^{31}$ is an iodine atom or a bromine atom, and a monomer represented by the general formula (4):

$$CF_2=CFO(CF_2CF(CF_3)O)_m(CF_2)_n-X^{41} \quad (4)$$

wherein m is an integer of 0 to 5, n is an integer of 1 to 3, and $X^{41}$ is a cyano group, a carboxyl group, an alkoxycarbonyl group and a bromine atom. These monomers may each be used singly, or may be used in arbitrary combination.

Specific examples of the VdF-based fluoroelastomer include a VdF/HFP-based elastomer, a VdF/TFE/HFP-based elastomer, a VdF/CTFE-based elastomer, a VdF/CTFE/TFE-based elastomer, a VdF/fluoromonomer represented by the general formula (1)-based elastomer, a VdF/fluoromonomer represented by the general formula (1)/TFE-based elastomer, a VdF/PMVE-based elastomer, a VdF/PMVE/TFE-based elastomer and a VdF/PMVE/TFE/HFP-based elastomer. As the VdF/fluoromonomer represented by the general formula (1)-based elastomer, at least one selected from the group consisting of a VdF/$CH_2=CFCF_3$-based elastomer and a VdF/$CH_2=CFCF_3$/HFP-based elastomer is preferable, and as the VdF/fluoromonomer represented by the general formula (1)/TFE-based elastomer, a VdF/TFE/$CH_2=CFCF_3$-based elastomer is preferable.

For the VdF/$CH_2=CFCF_3$-based elastomer, the VdF unit/the $CH_3=CFCF_3$ unit is preferably 40/60 to 99.5/0.5, and more preferably 50/50 to 85/15 in a molar ratio.

For the TFE/propylene-based fluoroelastomer, the TFE unit/the propylene unit is preferably 45/55 to 70/30 in a molar ratio.

For the VdF/HFP-based fluoroelastomer, the VdF unit/the HFP unit is preferably 80/20 to 65/35 in a molar ratio.

For the VdF/TFE/HFP-based fluoroelastomer, the VdF unit/the HFP unit/the TFE unit is preferably (25 to 80)/(10 to 45)/(5 to 40), more preferably (25 to 75)/(15 to 45)/(10 to 40), further preferably (25 to 70)/(15 to 45)/(15 to 40), and particularly preferably (25 to 65)/(15 to 45)/(20 to 40) in a molar ratio.

The content of each monomer unit in the fluoroelastomer (b) mentioned above can be calculated with appropriately combining NMR, FT-IR, elemental analysis and X-ray fluorescence analysis depending on the type of monomer.

The thermoplastic resin composition of the present disclosure comprises a polyamine compound (c) having a thermal decomposition temperature of 210° C. or higher. The polyamine compound (c) refers to a compound having two or more amino groups in one molecule. It is considered that the polyamine compound (c) not only acts as a crosslinking agent for the fluoroelastomer (b) but also reacts with a functional group of the fluororesin (A) and a polymer in an elastomer layer, thereby developing firm adhesiveness between the thermoplastic resin layer formed of the thermoplastic resin composition and the elastomer layer.

If a polyamine compound with a too low thermal decomposition temperature is used, a part thereof may be decomposed in the production process of the thermoplastic resin composition; therefore, not only the crosslinking of the fluoroelastomer (b) does not proceed sufficiently, but also a thermoplastic resin composition that has excellent barrier properties against fuel and adhesiveness to the elastomer layer, which is to be the opposite material, and that also has excellent heat resistance and flexibility cannot be obtained. The thermal decomposition temperature of the polyamine compound (c) is 210° C. or higher, preferably 250° C. or higher, and more preferably 275° C. or higher. Although the upper limit of the thermal decomposition temperature is not limited, it is normally 400° C. or lower.

The thermal decomposition temperature described above is a temperature at the time point when the amount of weight reduction has reached 1% of the initial weight in thermal gravimetric analysis [TG] of the polyamine compound (temperature-increasing rate: 10° C./min, under dry air).

Specific examples of the polyamine compound (c) include 2,2-bis[4-(4-aminophenoxy)phenyl]propane (hereinafter, referred to as BAPP), bis[4-(4-aminophenoxy)phenyl] sulfone (hereinafter, referred to as BAPS), 4,4'-diaminodiphenylsulfone (hereinafter, referred to as DDS), 3,3'-diaminodiphenylsulfone (hereinafter, referred to as 3,3'-DAS), 4,4'-[(1,3-phenylene)bis(dimethylmethylene)]bisaniline (hereinafter, referred to as bisaniline-M), 4,4'-[(1,4-phenylene)bis(dimethylmethylene)]bisaniline (hereinafter, referred to as bisaniline-P), 1,4-bis(4-aminophenoxy)-2-phenylbenzene (hereinafter, referred to as P-TPE-Q), 1,4-bis(4'-aminophenoxy)-2,3,5-trimethylbenzene (hereinafter, referred to as TMBAB), 1,3-bis(4-aminophenoxy)benzene (hereinafter, referred to as TPE-R), tris(4-aminophenyl) methane and tetrakis(4-aminophenyl)methane. These polyamine compounds (c) may be used singly, or may be used in arbitrary combination with a polyamine compound (c) having another structure. Among the above, BAPP, BAPS, DDS, 3,3'-DAS, P-TPE-Q, bisaniline-P, TMBAB and TPE-R are preferable, BAPP, BAPS, DDS, 3,3'-DAS and P-TPE-Q are more preferable, and BAPP is further preferable because a thermoplastic resin composition that has even more excellent barrier properties against fuel and adhesiveness to an elastomer layer is obtained.

It is preferable that the amount of the polyamine compound (c) to be compounded should be 0.5 to 15 parts by mass based on 100 parts by mass of the fluoroelastomer (b). If the amount to be compounded is too small, the crosslinking reaction of the fluoroelastomer (b) and the reaction with a functional group of the fluororesin (A) and a polymer in the elastomer layer may not proceed sufficiently to decrease the adhesiveness to the elastomer layer. In addition, if the amount to be compounded is too large, dispersion of the polyamine compound (c) may be insufficient, and there may be occurrence of molding failure, such as foaming, or a decrease in barrier properties against fuel. The amount of the polyamine compound (c) to be compounded is more preferably 1 to 12 parts by mass and further preferably 2 to 10 parts by mass.

In addition, in the thermoplastic resin composition of the present disclosure, it is preferable that the amount of a polyol cross-linking agent and a polyhydroxy compound should be 1 part by mass or less based on 100 parts by mass of the fluoroelastomer (b). If the amount of the polyol cross-linking agent and the polyhydroxy compound is too large, the crosslinking reaction of the fluoroelastomer (b) caused by the polyamine compound (c) and the reaction with a functional group of the fluororesin (A) and a polymer in the elastomer layer, which is to be the opposite material, may be inhibited, and the adhesiveness to the elastomer layer may be decreased. The content of the polyol cross-linking agent and the polyhydroxy compound is more preferably 0.1 parts by mass or less based on 100 parts by mass of the fluoroelastomer (b), and it is further preferable that they should not be contained at all.

As a crosslinking accelerator (d), which is to be used along with the polyamine compound (c), a crosslinking accelerator that has been conventionally used for accelerating the crosslinking of a polyol crosslinking system can be used.

Specifically, as the crosslinking accelerator (d), an onium compound can be used. The onium compound is not limited, and examples thereof include an ammonium compound such as a quaternary ammonium salt, a phosphonium compound such as a quaternary phosphonium salt, an oxonium compound, a sulfonium compound, a cyclic amine and a monofunctional amine compound. Among the above, a quaternary ammonium salt and a quaternary phosphonium salt are preferable.

The quaternary ammonium salt is not limited, and examples thereof include 8-methyl-1,8-diazabicyclo[5.4.0]-7-undecenium chloride, 8-methyl-1,8-diazabicyclo[5.4.0]-7-undecenium iodide, 8-methyl-1,8-diazabicyclo[5.4.0]-7-undecenium hydroxide, 8-methyl-1,8-diazabicyclo[5.4.0]-7-undecenium methylsulfate, 8-ethyl-1,8-diazabicyclo[5.4.0]-7-undecenium bromide, 8-propyl-1,8-diazabicyclo[5.4.0]-7-undecenium bromide, 8-dodecyl-1,8-diazabicyclo[5.4.0]-7-undecenium chloride, 8-dodecyl-1,8-diazabicyclo[5.4.0]-7-undecenium hydroxide, 8-eicosyl-1,8-diazabicyclo[5.4.0]-7-undecenium chloride, 8-tetracosyl-1,8-diazabicyclo[5.4.0]-7-undecenium chloride, 8-benzyl-1,8-diazabicyclo[5.4.0]-7-undecenium chloride (hereinafter, referred to as DBU-B), 8-benzyl-1,8-diazabicyclo[5.4.0]-7-undecenium hydroxide, 8-phenethyl-1,8-diazabicyclo[5.4.0]-7-undecenium chloride and 8-(3-phenylpropyl)-1,8-diazabicyclo[5.4.0]-7-undecenium chloride. Among the above, DBU-B is preferable in view of crosslinkability and the physical properties of the crosslinked product.

In addition, the quaternary phosphonium salt is not limited, and examples thereof may include tetrabutylphosphonium chloride, benzyltriphenylphosphonium chloride (hereinafter, referred to as BTPPC), benzyltrimethylphosphonium chloride, benzyltributylphosphonium chloride, tributylallylphosphonium chloride, tributyl-2-methoxypropylphosphonium chloride and benzylphenyl(dimethylamino)phosphonium chloride. Among the above, BTPPC is preferable in view of crosslinkability and the physical properties of the crosslinked product.

Alternatively, as the crosslinking accelerator, a crosslinking accelerator free from chlorine can also be used, which is disclosed in Japanese Patent Laid-Open No. 11-147891.

The amount of the crosslinking accelerator (d) to be compounded is preferably 0.01 to 10 parts by mass, more preferably 0.1 to 3 parts by mass, and further preferably 0.1 to 1.0 part by mass based on 100 parts by mass of the fluoroelastomer (b). If the amount of the crosslinking accelerator (d) is too small, the crosslinking reaction of the fluoroelastomer (b) caused by the polyamine compound (c) and the reaction with a functional group of the fluororesin (A) and a polymer in the elastomer layer, which is to be the opposite material, may not proceed sufficiently to decrease the adhesiveness to the elastomer layer. In addition, if the amount to be compounded is too large, there may be occurrence of dispersion failure, and the adhesiveness to the elastomer layer may be decreased after all.

It is preferable that the crosslinked fluoroelastomer (B) should be obtained by subjecting the fluoroelastomer (b) to the dynamic crosslinking treatment along with, in addition to the polyamine compound (c) and the crosslinking accelerator (d), an acid acceptor, because a thermoplastic resin composition that has even more excellent barrier properties against fuel and adhesiveness to an elastomer layer is obtained.

Examples of the acid acceptor may include magnesium oxide, magnesium hydroxide, barium hydroxide, magnesium carbonate, barium carbonate, quick lime, slaked lime, calcium carbonate, calcium silicate, calcium stearate, zinc stearate, calcium phthalate, calcium phosphite, tin oxide and basic tin phosphite, and among the above, magnesium oxide is preferable.

The amount of the acid acceptor to be compounded is preferably 0.01 to 10 parts by mass, more preferably 0.1 to 8 parts by mass, and further preferably 0.5 to 6 parts by mass based on 100 parts by mass of the fluoroelastomer (b).

It is preferable that the thermoplastic resin composition of the present disclosure should have electrical conductivity in order to prevent buildup of static charge and ignition. From this viewpoint, it is preferable that the thermoplastic resin composition of the present disclosure should comprise an electrically conductive material such as carbon black and acetylene black. The amount of the electrically conductive material is preferably 0.01 to 20% by mass, more preferably 1 to 18% by mass, and further preferably 5 to 15% by mass based on the thermoplastic resin composition of the present disclosure.

In addition, another polymer such as a polyethylene, a polypropylene, a polyamide, a polyester and a polyurethane; an inorganic filler such as talc, celite, clay, titanium oxide, carbon black and barium sulfate; a pigment; a flame retarder; a lubricant; a photostabilizer; a weathering stabilizer; an antistatic agent; an ultraviolet light absorber; an antioxidant; a mold releasing agent; a foaming agent; a flavor; an oil; and a softening agent can be added to the thermoplastic resin composition of the present disclosure as long as they do not affect the desired effects.

The present disclosure also relates to a method for producing the thermoplastic resin composition described above, comprising the step of subjecting the fluoroelastomer (b) to the dynamic crosslinking treatment along with the polyamine compound (c) having a thermal decomposition temperature of 210° C. or higher and the crosslinking accelerator (d) in the presence of the fluororesin (A) under conditions for melting the fluororesin (A).

Further, the above described process can include a step of kneading the fluoroelastomer (b) and the crosslinking accelerator (d), thereby obtaining a fluoroelastomer composition, a step of kneading the fluororesin (A) and the polyamine compound (c) at a temperature of the melting point of the fluororesin (A) or higher, thereby obtaining a fluororesin composition, and a step of kneading the fluororesin composition and the fluoroelastomer composition at a temperature of the melting point of the fluororesin (A) or higher.

Further, the above described process can include a step of kneading the fluoroelastomer (b) and the crosslinking accelerator (d), thereby obtaining a fluoroelastomer composition, a step of kneading the fluororesin (A) and the fluoroelastomer composition at a temperature of the melting point of the fluororesin (A) or higher, thereby obtaining a thermoplastic resin composition intermediate, and a step of kneading the thermoplastic resin composition intermediate and the polyamine compound (c) at a temperature of the melting point of the fluororesin (A) or higher.

Further, the above described process can include a step of kneading the fluoroelastomer (b), the polyamine compound (c) and the crosslinking accelerator (d), thereby obtaining a fluoroelastomer composition and a step of kneading the fluoroelastomer composition and the fluororesin (A) at a temperature of the melting point of the fluororesin (A) or higher. At this time, a solid solution formed by once melting the polyamine compound (c) and the crosslinking accelerator (d) to cause a melting point depression may be used, if necessary.

In any of the above processes, the fluoroelastomer (b) is dynamically crosslinked at the final kneading step, and the thermoplastic resin composition comprising the fluororesin (A) and the crosslinked fluoroelastomer (B) can be obtained.

For any of the kneadings described above, a Banbury mixer, a pressurizing kneader, an extruder or the like can be used.

Molded Article

A molded article of the present disclosure is formed from the thermoplastic resin composition described above. The shape of the molded article described above is not limited, and examples thereof include a tube, a hose, a sheet and a film.

The molded article described above can be produced by using a general molding processing method or a general molding processing apparatus. As the molding processing method, an arbitrary method such as injection molding, extrusion molding, compression molding, blow molding, calender molding and vacuum molding can be employed, for example.

In addition, in view of removing moisture, oligomers or others attached to the surface of the thermoplastic resin composition described above to thereby obtain a stable molded article with no appearance failure, it is preferable that a method for producing the molded article described above should include a step of heating and drying the thermoplastic resin composition described above prior to the step of molding the thermoplastic resin composition described above. The temperature during the heating and drying is preferably 80° C. or higher, more preferably 110° C. or higher, further preferably 130° C. or higher, and particularly preferably 150° C. or higher. The temperature during the heating and drying is preferably the melting point of the fluororesin (A) or lower, more preferably 230° C. or lower, further preferably 210° C. or lower, and particularly preferably 200° C. or lower.

After producing the molded article described above, volatile components in the molded article described above can also be removed by heating the obtained molded article described above.

Laminated Product

A laminated product of the present disclosure comprises a thermoplastic resin layer (W) formed from the thermoplastic resin composition described above and an elastomer layer (X) formed from an elastomer composition.

The elastomer composition described above comprises an elastomer, and examples of the elastomer include an acrylonitrile-butadiene rubber, a hydrogenated acrylonitrile-butadiene rubber, a blend rubber between an acrylonitrile-butadiene rubber and a polyvinyl chloride, a blend rubber between an acrylonitrile-butadiene rubber and an acrylic rubber, a chlorinated polyethylene, a fluoroelastomer, an epichlorohydrin rubber, an ethylene-propylene rubber, a chlorosulfonated polyethylene rubber, an acrylic rubber, a silicone rubber, a butyl rubber, a styrene-butadiene rubber, an ethylene-vinyl acetate copolymer, an α,β-unsaturated nitrile-conjugated diene copolymer rubber and a hydrogenated product of an α,β-unsaturated nitrile-conjugated diene copolymer rubber.

It is preferable that the elastomer composition described above should contain at least one elastomer selected from the group consisting of an acrylonitrile-butadiene rubber, a hydrogenated acrylonitrile-butadiene rubber, a blend rubber between an acrylonitrile-butadiene rubber and a polyvinyl chloride, a blend rubber between an acrylonitrile-butadiene rubber and an acrylic rubber, a chlorinated polyethylene, a fluoroelastomer, an epichlorohydrin rubber, an ethylene-propylene rubber, a chlorosulfonated polyethylene rubber, a silicone rubber and an acrylic rubber. Among the above, the elastomer composition described above more preferably contains at least one elastomer selected from the group consisting of an acrylonitrile-butadiene rubber, a hydrogenated acrylonitrile-butadiene rubber, a fluoroelastomer and an epichlorohydrin rubber, and further preferably contains a fluoroelastomer in view of heat resistance, oil resistance, weather resistance and extrusion moldability.

Examples of the fluoroelastomer to be contained in the elastomer composition described above include a VdF-based fluoroelastomer, a TFE/propylene-based fluoroelastomer, a TFE/propylene/VdF-based fluoroelastomer, an ethylene/HFP-based fluoroelastomer, an ethylene/HFP/VdF-based fluoroelastomer and an ethylene/HFP/TFE-based fluoroelastomer. Among the above, it is preferably at least one selected from the group consisting of a VdF-based fluoroelastomer and a TFE/propylene-based fluoroelastomer, and it is more preferably at least one selected from the group consisting of a VdF/HFP-based fluoroelastomer and a VdF/TFE/HFP-based fluoroelastomer. For the VdF/TFE/HFP-based fluoroelastomer, the VdF unit/the HFP unit/the TFE unit is preferably (25 to 65)/(15 to 45)/(20 to 40) in a molar ratio.

It is preferable that the elastomer composition described above should comprise at least one compound selected from the group consisting of an onium salt, an amine compound and an epoxy resin in view of improving the adhesive force between the thermoplastic resin layer (W) and the elastomer layer (X).

The onium salt is not limited, and examples thereof include a quaternary ammonium salt, a quaternary phosphonium salt, an oxonium salt, a sulfonium salt, a cyclic amine and a monofunctional amine compound. Among the above, a quaternary ammonium salt and a quaternary phosphonium salt are preferable.

The quaternary ammonium salt is not limited, and examples thereof include: a compound represented by the formula (5):

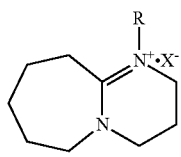

wherein R is a hydrogen atom or a monovalent organic group having 1 to 30 carbon atoms, and X⁻ is a monovalent anion; a compound represented by the formula (6):

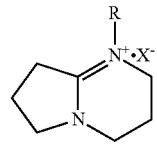

wherein R is a hydrogen atom or a monovalent organic group having 1 to 30 carbon atoms, and X⁻ is a monovalent anion; a compound represented by the formula (7):

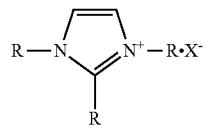

wherrein three R may be the same or different and are each a hydrogen atom or a monovalent organic group having 1 to 30 carbon atoms, and X⁻ is a monovalent anion; a compound represented by the formula (8):

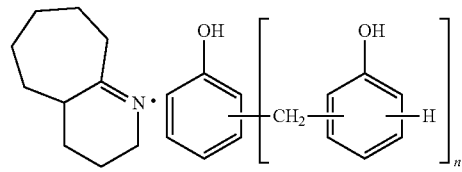

wherein n is an integer of 0 to 50; and a compound represented by the formula (9):

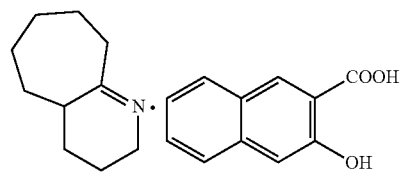

R in the formula (5) is a hydrogen atom or a monovalent organic group having 1 to 30 carbon atoms.

Although the monovalent organic group having 1 to 30 carbon atoms is not limited, examples thereof include an aliphatic hydrocarbon group, a benzyl group, a phenethyl group and a 3-phenylpropyl group. Examples of X⁻ in the formula (5) include a halogen ion (F⁻, Cl⁻, Br⁻ and I⁻), OH⁻, RO⁻, HCOO⁻, RCOO⁻, C₆H₃O⁻, ROSO₃⁻ and RSO₃⁻ (R is a monovalent organic group). Specific examples of the compound of the formula (5) include 8-methyl-1,8-diazabicyclo[5.4.0]-7-undecenium chloride, 8-methyl-1,8-diazabicyclo[5.4.0]-7-undecenium iodide, 8-methyl-1,8-diazabicyclo[5.4.0]-7-undecenium hydroxide, 8-methyl-1,8-diazabicyclo[5.4.0]-7-undecenium methylsulfate, 8-ethyl-1,8-diazabicyclo[5.4.0]-7-undecenium bromide, 8-propyl-1,8-diazabicyclo[5.4.0]-7-undecenium bromide, 8-dodecyl-1,8-diazabicyclo[5.4.0]-7-undecenium chloride, 8-dodecyl-1,8-diazabicyclo[5.4.0]-7-undecenium hydroxide, 8-eicosyl-1, 8-diazabicyclo[5.4.0]-7-undecenium chloride, 8-tetracosyl-1,8-diazabicyclo[5.4.0]-7-undecenium chloride, DBU-B, 8-benzyl-1,8-diazabicyclo[5.4.0]-7-undecenium hydroxide, 8-phenethyl-1,8-diazabicyclo[5.4.0]-7-undecenium chloride, 8-(3-phenylpropyl)-1,8-diazabicyclo[5.4.0]-7-undecenium chloride, 1,8-diazabicyclo[5.4.0]-7-undecenium phthalate, 1,8-diazabicyclo[5.4.0]-7-undecenium tosylate, 1,8-diazabicyclo[5.4.0]-7-undecenium phenolate, 1,8-diazabicyclo[5.4.0]-7-undecenium naphthoate, 1,8-diazabicyclo[5.4.0]-7-undecenium octanoate, 1,8-diazabicyclo[5.4.0]-7-undecenium oleate, 1,8-diazabicyclo[5.4.0]-7-undecenium formate and 1,8-diazabicyclo[5.4.0]-7-undecenium chloride.

R in the formula (6) is a hydrogen atom or a monovalent organic group having 1 to 30 carbon atoms. Although the monovalent organic group having 1 to 30 carbon atoms is not limited, examples thereof include an aliphatic hydrocarbon group and a benzyl group. Examples of $X^-$ in the formula (6) include a halogen ion ($F^-$, $Cl^-$, $Br^-$ and $I^-$), $HCO_3^-$, $OH^-$, $RO^-$, $HCOO^-$, $RCOO^-$, $C_6H_5O^-$, $ROSO_3^-$ and $RSO_3^-$ (R is a monovalent organic group). Specific examples of the formula (6) include 1,8-diazabicyclo[4.3.0]-5-nonenium phthalate, 1,8-diazabicyclo[4.3.0]-5-nonenium tosylate, 1,8-diazabicyclo[4.3.0]-5-nonenium phenolate, 1,8-diazabicyclo[4.3.0]-5-nonenium naphthoate, 1,8-diazabicyclo[4.3.0]-5-nonenium octanoate, 1,8-diazabicyclo[4.3.0]-5-nonenium oleate, 1,8-diazabicyclo[4.3.0]-5-nonenium formate and 1,8-diazabicyclo[4.3.0]-5-nonenium chloride.

In the formula (7), three R are the same as or different from each other and are each a hydrogen atom or a monovalent organic group having 1 to 30 carbon atoms. Although the monovalent organic group having 1 to 30 carbon atoms is not limited, examples thereof include an aliphatic hydrocarbon group, an aryl group such as a phenyl group, and a benzyl group. Specific examples thereof include an alkyl group having 1 to 30 carbon atoms such as $-CH_3$, $-C_2H_5$ and $-C_3H_7$; a halogen atom containing alkyl group having 1 to 30 carbon atoms such as $-CX^{71}_3$, $-C_2X^{71}_3$, $-CH_2X^{71}$, $-CH_2CX^{71}_3$ and $-CH_2C_2X^{71}_5$ ($X^{71}$ is a fluorine atom, a chlorine atom, a bromine atom or an iodine atom); a phenyl group; a benzyl group; a phenyl group or benzyl group in which 1 to 5 hydrogen atoms are substituted with fluorine atoms, such as $-C_6F_5$ and $-CH_2C_6F_5$; and a phenyl group or benzyl group in which 1 to 5 hydrogen atoms are substituted with $-CF_3$, such as $-C_6H_{5-n}(CF_3)_n$ and $-CH_2C_6H_{5-n}(CF3)_n$ (n is an integer of 1 to 5). In addition, as in the formula (10):

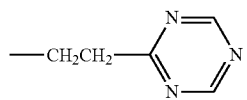

it may contain a nitrogen atom. Examples of $X^-$ in the formula (7) include a halogen ion ($F^-$, $Cl^-$, $Br^-$ and $I^-$), $HCO_3^-$, $OH^-$, $RO^-$, $HCOO^-$, $RCOO^-$, $C_6H_5O^-$, $ROSO_3^-$ and $RSO_3^-$ (R is a monovalent organic group).

Among the above, the compound represented by the formula (5), the formula (6), the formula (7) or the formula (8) is preferable in view of good adhesive force between the thermoplastic resin layer (W) and the elastomer layer (X). As the compound represented by the formula (5), DBU-B, 1,8-diazabicyclo[5.4.0]-7-undecenium naphthoate, 1,8-diazabicyclo[5.4.0]-7-undecenium phenolate, 1,8-diazabicyclo[5.4.0]-7-undecenium phthalate or 1,8-diazabicyclo[5.4.0]-7-undecenium formate is more preferable, and DBU-B or 1,8-diazabicyclo[5.4.0]-7-undecenium formate is further preferable. As the compound represented by the formula (7), a compound of the formula (7), wherein three R are each an alkyl group having 1 to 20 carbon atoms or a benzyl group and $X^-$ is $Cl^-$, is more preferable, and a compound represented by the formula (11):

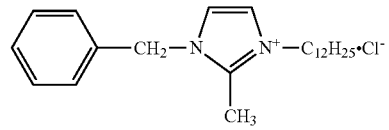

is further preferable. In addition, as the compound represented by the formula (8), n is more preferably an integer of 0 to 10, and further preferably an integer of 1 to 5 in view of dispersibility upon kneading with the rubber.

Among the above, DBU-B is particularly preferable.

The quaternary phosphonium salt is not limited, and examples thereof may include tetrabutylphosphonium chloride, BTPPC, benzyltrimethylphosphonium chloride, benzyltributylphosphonium chloride, tributylallylphosphonium chloride, tributyl-2-methoxypropylphosphonium chloride and benzylphenyl(dimethylamino)phosphonium chloride. Among the above, BTPPC is preferable in view of good adhesive force between the thermoplastic resin layer (W) and the elastomer layer (X).

Alternatively, a solid solution of a quaternary ammonium salt or quaternary phosphonium salt and bisphenol AF, or a compound disclosed in Japanese Patent Laid-Open No. 11-147891 may also be used.

The amount of the onium salt to be compounded is preferably 0.1 to 10.0 parts by mass, more preferably 0.2 to 8.0 parts by mass, and further preferably 0.3 to 7.0 parts by mass based on 100 parts by mass of the elastomer because sufficient adhesiveness is obtained and good dispersibility of the onium salt to the elastomer composition is obtained.

The amine compound is not limited, and examples thereof that can be used include an aliphatic polyamine compound derivative such as hexamethylenediamine carbamate, N,N'-dicinnamylidene-1,6-hexamethylenediamine (hereinafter, referred to as V3) and 4,4'-bis(aminocyclohexyl)methane carbamate; and an aromatic polyamine compound such as 4,4'-diaminodiphenyl ether (hereinafter, referred to as 4,4'-DPE), BAPP, BAPS, DDS, 3,3'-DAS, P-TPE-Q, bisaniline-M, bisaniline-P, TMBAB, TPE-R, p-phenylenediamine, m-phenylenediamine, 2,5-dimethyl-1,4-phenylenediamine, N,N'-dimethyl-1,4-phenylenediamine, 4,4'-methylenedianiline, dianilinoethane, 4,4'-methylene-bis(3-nitroaniline), 4,4'-methylene-bis(2-chloroaniline), diaminopyridine and melamine. Among the above, V3, 4,4'-DPE, BAPP, BAPS, DDS, 3,3'-DAS, P-TPE-Q, bisaniline-M, bisaniline-P, TMBAB and TPE-R are preferable, and V3, 4,4'-DPE, BAPP, P-TPE-Q, bisaniline-M, bisaniline-P, TMBAB and TPE-R are more preferable in view of good adhesive force between the thermoplastic resin layer (W) and the elastomer layer (X).

The amount of the amine compound to be compounded is preferably 0.1 to 10.0 parts by mass, more preferably 0.2 to 8.0 parts by mass, and further preferably 0.3 to 7.0 parts by mass based on 100 parts by mass of the elastomer because sufficient adhesiveness is obtained and good dispersibility of the amine compound to the elastomer composition is obtained.

Examples of the epoxy resin include, a bisphenol A-type epoxy resin, a bisphenol F-type epoxy resin and a multifunctional epoxy resin. Among the above, examples of the bisphenol A-type epoxy resin include a compound represented by the formula (12):

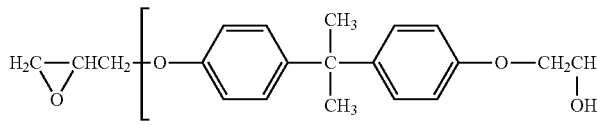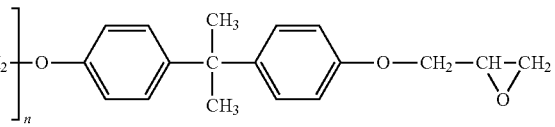

Here, n in the formula (12) is preferably 0.1 to 3, more preferably 0.1 to 0.5, and further preferably 0.1 to 0.3 because sufficient adhesiveness is obtained and good dispersibility of the epoxy resin to the elastomer composition is obtained.

The amount of the epoxy resin to be compounded is preferably 0.1 to 20.0 parts by mass, more preferably 0.3 to 15.0 parts by mass, and further preferably 0.5 to 10.0 parts by mass based on 100 parts by mass of the elastomer because sufficient adhesiveness and flexibility of the elastomer layer (X) are obtained.

For the elastomer layer (X), either unvulcanized elastomer or vulcanized elastomer may be used.

As a vulcanizing agent, any vulcanizing agent that is used for a normal elastomer can be used. Examples of the vulcanizing agent include a sulfur-type vulcanizing agent, a peroxide-type vulcanizing agent, a polythiol-type vulcanizing agent, a quinoid-type vulcanizing agent, a resin-type vulcanizing agent, a metal oxide, a diamine-type vulcanizing agent, a polythiol, 2-mercaptoimidazoline, a polyol-type vulcanizing agent and a polyamine-type vulcanizing agent. Among the above, a peroxide-type vulcanizing agent, a polyol-type vulcanizing agent, a polyamine-type vulcanizing agent and the like are preferable in view of adhesiveness and mechanical properties of the obtained vulcanized elastomer, and a polyol-type vulcanizing agent is more preferable in view of improving the adhesive force between the thermoplastic resin layer (W) and the elastomer layer (X).

The amount of the vulcanizing agent to be compounded in the elastomer composition is preferably 0.2 to 10 parts by mass and more preferably 0.5 to 8 parts by mass based on 100 parts by mass of the elastomer because a moderate vulcanization density and a moderate permanent compression set are obtained.

In addition, in the elastomer composition, a normal additive that is compounded in an elastomer as necessary, for example, a variety of additive agents such as a filler, a processing aid, a plasticizer, a coloring agent, a stabilizer, a vulcanization aid, an adhesive aid, an acid acceptor, a mold releasing agent, an electrical conductivity imparting agent, a thermal conductivity imparting agent, a surface non-adhesive, a flexibility imparting agent, a heat resistance improving agent and a flame retarder, can be compounded, and one or more commonly used vulcanizing agents or vulcanization accelerators that are different from those described above may be compounded.

The elastomer composition can be obtained by kneading the elastomer, the onium salt, amine compound and/or epoxy resin, and another compounding agent such as a vulcanizing agent, a vulcanization aid, a covulcanization agent, a vulcanization accelerator and a filler, using a rubber kneading apparatus that is generally used. As the rubber kneading apparatus, a roller, a kneader, a Banbury mixer, an internal mixer, a twin screw extruder and the like can be used.

In particular, when a polyol-type vulcanizing agent is used as the vulcanizing agent, the vulcanizing agent and/or vulcanization accelerator often have a relatively high melting point; thus, in order to homogeneously disperse the vulcanizing agent and/or vulcanization accelerator in the elastomer, it is preferable to employ a method in which the vulcanizing agent and/or vulcanization accelerator is melted and kneaded at a high temperature of 120 to 200° C. using a sealed type kneading apparatus such as a kneader, and in which another compounding agent such as a filler is then kneaded at a relatively low temperature of or below the above temperature. In addition, the vulcanizing agent and the vulcanization accelerator may be once melted to create a solid solution having a lowered melting point, and this solid solution may be homogeneously dispersed.

The vulcanization conditions may be appropriately determined depending on the types of the vulcanizing agent to be used and the like, but calcination is carried out normally at a temperature of 150 to 300° C. for 1 minute to 24 hours.

In addition, as the vulcanization method, not only a method that is normally used such as steam vulcanization, but also a vulcanization reaction under normal pressure, increased pressure or reduced pressure, or in air, under any conditions can be carried out.

The laminated product of the present disclosure can be produced by laminating a sheet-like thermoplastic resin layer (W) and a sheet-like elastomer layer (X) before vulcanization, setting them in a metal mold, and heat pressing them for vulcanized adhesion. Alternatively, the laminated product of the present disclosure can be produced by simultaneously extruding two layers of the thermoplastic resin layer (W) and the elastomer layer (X) with an extruder or extruding an inner layer from one extruder and an outer layer on the inner layer from another extruder, thereby creating a laminated product composed of the inner layer and the outer layer, which is then extruded from an extruder to integrate the layers and is then subjected to vulcanized adhesion.

The laminated product of the present disclosure may have a two layer structure formed of the thermoplastic resin layer (W) and the elastomer layer (X), a structure in which elastomer layers (X) are laminated on both sides of the thermoplastic resin layer (W), or a structure in which thermoplastic resin layers (W) are laminated on both sides of the elastomer layer (X). For example, the laminated product of the present disclosure may have a three layer structure such as the elastomer layer (X)-the thermoplastic resin layer (W)-the elastomer layer (X) or the thermoplastic resin layer (W)-the elastomer layer (X)-the thermoplastic resin layer (W). Furthermore, the laminated product of the present disclosure may have a multilayer structure with three or more layers in which a polymer layer (Y) other than the elastomer layer (X) or the thermoplastic resin layer (W) is adhered, or may have a polymer layer (Z) on either one side or both sides of a multilayer structure with three layers in which the polymer layer (Y) other than the elastomer layer (X) or the thermoplastic resin layer (W) is adhered. The polymer layer (Y) and the polymer layer (Z) may be the same or different.

The laminated product of the present disclosure may have the polymer layer (Y) on either one side or both sides of a three layer structure of the elastomer layer (X)-the thermoplastic resin layer (W)-the elastomer layer (X).

The polymer layers (Y) and (Z) may be rubber layers (Y1) and (Z1) other than the elastomer layer (X), respectively. Examples of the rubber layer (Y1) or (Z1) include a non-fluoroelastomer layer (Y1a) or (Z1a) formed of a non-fluoroelastomer. A non-fluoroelastomer is preferable because it has good cold resistance and is excellent in costs. The non-fluoroelastomer layer (Y1a) and the non-fluoroelastomer layer (Z1a) may be formed from the same non-fluoroelastomer, or may be formed from different non-fluoroelastomers. The laminated product of the present disclosure may be a laminated product in which the elastomer layer (X), the thermoplastic resin layer (W) and the non-fluoroelastomer layer (Y1a) are laminated in this order. Alternatively, the laminated product of the present disclosure may further comprise a non-fluoroelastomer layer (Z1a), and may have a structure in which the non-fluoroelastomer layer (Z1a), the elastomer layer (X), the thermoplastic resin layer (W) and the non-fluoroelastomer layer (Y1a) are laminated in this order; the elastomer layer (X), the thermoplastic resin layer (W), the non-fluoroelastomer layer (Z1a) and the non-fluoroelastomer layer (Y1a) are laminated in this order; or the elastomer layer (X), the thermoplastic resin layer (W), the non-fluoroelastomer layer (Y1a) and the non-fluoroelastomer layer (Z1a) are laminated in this order.

Specific examples of the non-fluoroelastomer include a diene-type rubber such as an acrylonitrile-butadiene rubber (NBR) or its hydrogenated product (HNBR), a styrene-butadiene rubber (SBR), a chloroprene rubber (CR), a butadiene rubber (BR), a natural rubber (NR) and an isoprene rubber (IR); ethylene-propylene-termonomer copolymer rubber, a silicone rubber, a butyl rubber, an epichlorohydrin rubber, an acrylic rubber, a chlorinated polyethylene (CPE), a polyblend of an acrylonitrile-butadiene rubber and vinyl chloride (PVC-NBR) and an ethylene propylene diene rubber (EPDM). In addition, examples of the non-fluoroelastomer include a rubber obtained by mixing these non-fluoroelastomers with a fluoroelastomer at an arbitrary ratio. It is preferable that the non-fluoroelastomer should be a diene-type rubber or an epichlorohydrin rubber in view of good heat resistance, oil resistance, weather resistance and extrusion moldability. More preferably, it is an NBR, a HNBR or an epichlorohydrin rubber. It is preferable that the rubber layer (Y1) should be formed from an NBR, a HNBR or an epichlorohydrin rubber. In addition, it is preferable that the rubber layer (Z1) should be formed from an acrylonitrile-butadiene rubber, an epichlorohydrin rubber, a chlorinated polyethylene (CPE), a polyblend of an acrylonitrile-butadiene rubber and vinyl chloride (PVC-NBR), an ethylene propylene diene rubber (EPDM), an acrylic rubber or a mixture thereof in view of weather resistance and costs. In the unvulcanized rubber composition that forms the rubber layers (Y1) and (Z1), a vulcanizing agent or another compounding agent may also be compounded.

In addition, a surface treatment may be carried out on the thermoplastic resin layer (W), if necessary, in order to further improve the adhesiveness between the thermoplastic resin layer (W) and the elastomer layer (X). For this surface treatment, the type thereof is not limited as long as it is a treatment method that enables adhesion, and examples thereof include a discharge treatment such as a plasma discharge treatment and a corona discharge treatment, and a metallic sodium/naphthalene solution treatment, which is a wet method. In addition, a primer treatment is suitable as the surface treatment. The primer treatment can be carried out in accordance with a conventional method. In the case of performing the primer treatment, the surface of the thermoplastic resin layer (W) that has not been subjected to a surface treatment may be treated. However, if the primer treatment is further performed on the surface of the thermoplastic resin layer (W) that has been subjected to a plasma discharge treatment, a corona discharge treatment, a metallic sodium/naphthalene solution treatment or the like in advance, it is more effective.

In the laminated product of the present disclosure, the interlayer initial adhesive strength between the thermoplastic resin layer (W) described above and the elastomer layer (X) described above is preferably 10 N/cm or more, more preferably 12 N/cm or more, and further preferably 15 N/m. Although the upper limit thereof is not limited, it may be 50 N/cm or less. If the adhesive strength is too small, upon vulcanizing a hose in a particular shape, displacement may occur, or the layers may be peeled off when an impact is applied. The interlayer initial adhesive strength is a value obtained by carrying out a peeling test at a tensile speed of 50 mm/min at 25° C. in accordance with JIS-K-6256 (adhesion testing method for vulcanized rubber) to measure the adhesive strength, and calculating the mean value of the obtained data (N=3). In the laminated product of the present disclosure, particularly because the thermoplastic resin layer (W) is formed from a characteristic thermoplastic resin composition, such a high interlayer initial adhesive strength can be exhibited.

The thermoplastic resin composition, molded article and laminated product of the present disclosure are excellent in barrier properties against fuel and adhesiveness to a fluoroelastomer, and are also excellent in heat resistance and crack resistance. Therefore, they can be used in a variety of applications.

For example, they have suitable characteristics as a gasket, a seal such as a non-contact-type and contact-type packing (a self seal packing, a piston ring, a split ring type packing, a mechanical seal, an oil seal and the like), a bellow, a diaphragm, a hose, a tube, an electric wire and the like, for which heat resistance, oil resistance, fuel oil resistance, LLC resistance and steam resistance are required, of the engine main body of an automobile engine, main motion system, valve system, lubrication/cooling system, fuel system, intake/exhaust system and the like, transmission system and the like of drive system, chassis steering system, brake system and the like, and basic electrical component, control system electrical component, equipped electrical component and the like of electrical equipment.

Specifically, they can be used in applications listed below.

For the engine main body, a cylinder head gasket, a cylinder head cover gasket, an oil pan packing, a gasket such as a general gasket, an O-ring, a packing, a seals such as a timing belt cover gasket, a hose such as a control hose, a vibration proof rubber of an engine mount, a sealing material for high pressure valves in a hydrogen storage system, and the like.

For the main motion system, a shaft seal such as a crankshaft seal and a camshaft seal, and the like.

For the valve system, a valve stem seal for engine valves and the like.

For the lubrication/cooling system, an engine oil cooler hose of an engine oil cooler, an oil return hose, a seal gasket and the like, and a water hose around a radiator, a vacuum pump oil hose of a vacuum pump and the like.

For the fuel system, a hose or tube for fuel, other fuel system members and the like. As the hose or tube for fuel, a filler (neck) hose, a fuel hose such as a fuel supply hose, a fuel return hose and a vapor (evaporation) hose, an in-tank hose of a fuel tank, a fuel piping tube, a control hose of a carburetor and the like. As the other fuel system members, an oil seal of a fuel pump, a diaphragm, a valve and the like, a filler seal of a fuel tank, a tank packing, an in-tank fuel pump mount and the like, a connector O-ring of a fuel piping tube, an injector cushion ring, an injector seal ring, an injector O-ring, a pressure regulator diaphragm, a check valve and the like of a fuel injection apparatus, a needle valve petal of a carburetor, an acceleration pump piston, a flange gasket and the like, a valve seat and a diaphragm of a complex air flow control system (CAC), and the like. Among the above, the thermoplastic resin composition, molded article and laminated product of the present disclosure are suitable as a hose or tube for fuel, and especially suitable as a filler neck hose or a fuel supply hose.

For the intake/exhaust system, an intake manifold packing, an exhaust manifold packing and the like of a manifold, a diaphragm, a control hose, an emission control hose and the like for EGR (exhaust gas recirculation), a diaphragm and the like for BPT, an afterburn prevention valve seat and the like of an AB valve, a throttle body packing of a throttle, a turbocharger turbo oil hose (supply), a turbo oil hose (return), a turbo air hose, an intercooler hose, a turbine shaft seal and the like.

For the transmission system, a transmission related bearing seal, an oil seal, an O-ring, a packing, a torque converter hose and the like, an AT transmission oil hose, an ATF hose, an O-ring, a packing and the like.

For the steering system, a power steering oil hose and the like.

For the brake system, an oil seal, an O-ring, a packing, a brake oil hose and the like, a Mastervac atmospheric valve, a vacuum valve, a diaphragm and the like, a piston cup (a rubber cup) and the like of a master cylinder, a caliper seal, a boot and the like.

For the basic electrical component, an insulator, a sheath and the like of an electric wire (harness), a tube of a harness exterior component, and the like.

For the control system electrical component, a coating material for various sensor wires, and the like.

For the equipped electrical component, an O-ring, a packing and a cooler hose of a car air conditioner, an exterior wiper blade and the like.

In addition to applications for automobiles, the thermoplastic resin composition, molded article and laminated product of the present disclosure are suitable in applications for, for example, an oil resistant, chemically resistant, heat resistant, steam resistant or weather resistant packing, O-ring, hose, other sealing material, diaphragm and valve in a transportation means such as a vessel and an aircraft; a similar packing, O-ring, sealing material, diaphragm, valve, hose, roll, tube, chemically resistant coating and lining in a chemical plant; a similar packing, O-ring, hose, sealing material, belt, diaphragm, valve, roll and tube in food plant equipment and food equipment (including household articles); a similar packing, O-ring, hose, sealing material, diaphragm, valve and tube in nuclear plant equipment; and a similar packing, O-ring, hose, sealing material, diaphragm, valve, roll, tube, lining, mandrel, electric wire, flexible joint, belt, rubber plate, weather strip, PPC copier roll blade and the like in a general industrial component.

In an application as a food rubber sealing material, problems of conventional rubber sealing materials are that they have smelling properties and that rubber fragments and the like may be mixed into food. However, by using the molded article of the present disclosure, these problems can be improved and the molded article of the present disclosure can be suitably used. Due to their chemical resistance, low elution properties and low smelling properties, the thermoplastic resin composition, molded article and laminated product of the present disclosure can be applied in the medical and chemical fields for an oil resistant, chemically resistant, heat resistant, steam resistant or weather resistant sealing material, lid material, belt, roll, hose, tube, film, coating, lining, joint, container and the like. In the general industrial field, for the purpose of improving the strength, slipperiness, chemical resistance and permeability of the rubber material, they can be suitably used for, for example, a rubber roll, an O-ring, a packing, a sealing material and the like. In particular, they can be suitably used for a packing application of a lithium ion battery because both chemical resistance and seal can be maintained at the same time. Besides, they can be suitably used in an application where slidability due to low friction is required.

Among the above, the thermoplastic resin composition, molded article and laminated product of the present disclosure are suitably used as a hose or tube for fuel, and in particular, suitably used as a filler neck hose or a fuel supply hose. That is, the molded article and laminated product described above is preferably a hose or tube for fuel, and is particularly preferably a filler neck hose or a fuel supply hose.

While various embodiments have been described herein above, it is to be appreciated that various changes in foam and detail may be made without departing from the spirit and scope presently or hereafter claimed.

EXAMPLES

Hereinafter, embodiments of the present disclosure will be described with reference to Examples, but the present disclosure is not limited solely to such Examples.

Each numerical value in Examples was measured according to the following method.

Monomeric Composition

The monomeric composition was measured by $^{19}$F-NMR analysis.

Melting Point

The melting point was obtained by recording the melting peak upon increasing the temperature at a rate of 10° C./min using a differential scanning calorimeter [DSC] and determining a temperature corresponding to the maximum value.

Melt Flow Rate (MFR)

The MFR was obtained by measuring the mass (g) of a polymer flowing out from the nozzle with a diameter of 2 mm and a length of 8 mm per unit time (10 minutes) under a load of 5 kg at 297° C., using a melt indexer (manufactured by Toyo Seiki Seisaku-sho, Ltd.).

Number of Functional Groups of Fluororesin

For a fluororesin sheet, the infrared absorption spectrum was analyzed by using a Fourier transform infrared spectrophotometer [FT-IR]. The absorbance of a certain peak was measured by automatically determining the baseline of the obtained infrared absorption spectrum using Perkin-Elmer Spectrum for windows Ver. 1.4C. Note that the peak derived from the carbonyl group of a carbonate group [—OC(=O)O—] is exhibited at an absorption band of 1,810 to 1,815 $cm^{-1}$.

Mooney Viscosity

The Mooney viscosity was measured in accordance with ASTM D-1646 at 121° C. using a Mooney viscometer, Model MV2000E manufactured by Alpha Technologies.

Infrared Absorption Spectrum Analysis (Fabrication of Thermoplastic Resin Sheet)
The thermoplastic resin composition was placed in a metal mold with a diameter of 120 mm, set in a press machine that had been heated to 300° C., and subjected to melt pressing at a pressure of about 2.9 MPa, thereby obtaining a thermoplastic resin sheet with a thickness of 0.25 mm or a thickness of 0.5 mm.
(Calculation of Ratio between Heights of Absorption Peaks)
For the thermoplastic resin sheet with a thickness of 0.25 mm, the infrared absorption spectrum was measured by the transmission method using a Fourier transform infrared spectrophotometer [FT-IR], and the ratio [K1] and the ratio [K2] were calculated according to the following equations.

Ratio $[K1] = H1a/H1b$

Ratio $[K2] = H2a/H2b$

H1a: the absorbance height at 3,451 $cm^{-1}$ from a straight line obtained by connecting each absorbance at 3,475 $cm^{-1}$ and 3,415 $cm^{-1}$ as the baseline H1b: the absorbance height at 2,360 $cm^{-1}$ from a straight line obtained by connecting each absorbance at 2,680 $cm^{-1}$ and 2,030 $cm^{-1}$ as the baseline H2a: the absorbance height at 1,722 $cm^{-1}$ from a straight line obtained by connecting each absorbance at 1,760 $cm^{-1}$ and 1,660 $cm^{-1}$ as the baseline H2b: the absorbance height at 3,035 $cm^{-1}$ from a straight line obtained by connecting each absorbance at 3,170 $cm^{-1}$ and 2,900 $cm^{-1}$ as the baseline

Evaluation of Barrier Properties against Fuel (Fuel Permeability Coefficient)
In a container made of SUS having a volume of 20 mL (opening area: $1.26 \times 10^{-3}$ $m^2$), 18 mL of CE10 (toluene/isooctane/ethanol=45/45/10% by volume), which is a simulant fuel, was placed, and the thermoplastic resin sheet with a thickness of 0.25 mm fabricated according to the method described above was set at the opening of the container to seal it, thereby creating a test piece. The test piece was placed in a thermostat (60° C.), the weight of the test piece was measured, and when the weight reduction per unit time became constant, the fuel permeability coefficient was determined according to the following equation. The fuel permeability coefficient of a fluororesin was determined in the same manner.

$$\text{Fuel Permeability Coefficient } ((g \cdot mm)/(m^2 \cdot day)) = \frac{[\text{Weight Reduction (g)}] \times [\text{Sheet Thickness (mm)}]}{[\text{Opening Area } 1.26 \times 10^{-3} (m^2)] \times [\text{Measurement Interval (day)}]}$$

Tensile Elasticity

From the thermoplastic resin sheet with a thickness of 0.5 mm fabricated according to the method described above, a dumbbell-shaped specimen with a distance between marked lines of 3.18 mm was punched out using an ASTM D638 Type V dumbbell. For the obtained dumbbell-shaped specimen, a tensile test was carried out at a tensile speed of 50 mm/min at 25° C. in accordance with ASTM D638 with Autograph (AGS-J 5kN manufactured by Shimadzu Corporation), thereby measuring the tensile elasticity. The tensile elasticity of a fluororesin was measured in the same manner.

Evaluation of Adhesiveness (Fabrication of Elastomer Composition)
To 100 parts by mass of a VdF/TFE/HFP copolymer with a monomeric composition of VdF/TFE/HFP=58/20/22 (molar ratio) and a Mooney viscosity ML (1+10) at 121° C. of 44, 2.2 parts by mass of bisphenol AF and 0.56 parts by mass of DBU-B were added and kneaded, thereby obtaining an elastomer composition intermediate. To 100 parts by mass of the elastomer composition intermediate, 3.0 parts by mass of magnesium oxide, 6 parts by mass of calcium hydroxide and 13 parts by mass of SRF carbon black were added and kneaded, thereby obtaining an elastomer composition.
(Fabrication of Laminated Product)
The thermoplastic resin sheet with a thickness of 0.5 mm fabricated according to the method described above and a sheet of the elastomer composition with a thickness of about 2 mm were superposed, and these sheets were introduced in a metal mold for forming a sheet with a thickness of 2 mm and pressed at 160° C. for 45 minutes, thereby obtaining a sheet-like laminated product.
(Method for Evaluating Adhesiveness)
Each of the obtained laminated products was cut into strips having a width of 1.0 cm by 10 cm to fabricate a test piece for the adhesion test, and for this test piece, the peeling test was carried out at a tensile speed of 50 mm/min at 25° C. in accordance with the method described in JIS-K-6256 (adhesion testing method for vulcanized rubber) with Autograph (AGS-J 5kN manufactured by Shimadzu Corporation). In addition, the peeling mode was observed and evaluated according to the following criteria.

Good: The elastomer layer was broken without peeling at the interface of thermoplastic resin layer/elastomer layer.

Poor: The layers were peeled at the interface of thermoplastic resin layer/elastomer layer.

The following materials were used in Examples and Comparative Examples.
Fluororesin:
CTFE/TFE copolymer having a —OC(=O)OCH$_2$CH$_2$CH$_3$ group. The monomeric composition is CTFE/TFE/perfluoro(propyl vinyl ether)=21.0/76.2/2.8 (molar ratio). The melting point is 245° C. The MFR at 297° C. is 19 g/10 min. The number of —OC(=O)OCH$_2$CH$_2$CH$_3$ groups is 80 (per $10^6$ carbon atoms). The tensile elasticity is 610 MPa. The fuel permeability coefficient is 0.4 (g·mm)/($m^2$·day).

Fluoroelastomer (b1):
  VdF/TFE/HFP copolymer with a monomeric composition of VdF/TFE/HFP=50/20/30 (molar ratio). The Mooney viscosity ML (1+10) at 121° C. is 50.
Fluoroelastomer (b2):
  VdF/TFE/HFP copolymer with a monomeric composition of VdF/TFE/HFP=58/20/22 (molar ratio). The Mooney viscosity ML (1+10) at 100° C. is 45.
  Polyamine compound: BAPP (thermal decomposition temperature: 315° C.)
Crosslinking accelerator: DBU-B
Acid acceptor: magnesium oxide

Example 1

Step 1

To the fluoroelastomer (b1) described above, DBU-B and magnesium oxide were added and kneaded, thereby obtaining a fluoroelastomer composition (b1-1).

Step 2

The fluororesin described above was placed in LABO PLASTOMILL (manufactured by Toyo Seiki Seisaku-sho, Ltd.), BAPP was added thereto, and the contents were stirred until the dispersion and reaction sufficiently proceeded to result in a stable torque. Furthermore, the fluoroelastomer composition (b1-1) was added, and stirring was stopped when the dispersion and reaction sufficiently proceeded to result in a stable torque, thereby obtaining a thermoplastic resin composition. At this time, the temperature of the thermoplastic resin composition was 280° C. The amount of each material to be compounded and the results of various measurements are shown in Table 1.

Example 2

A thermoplastic resin composition was obtained by carrying out kneading under the same conditions as in Example 1, except that in the step 2, BAPP and the fluoroelastomer composition (b1-1) were added in the reverse order. The amount of each material to be compounded and the results of various measurements are shown in Table 1.

Comparative Example 1

A thermoplastic resin composition was obtained by carrying out kneading under the same conditions as in Example 1, except that in the step 1, DBU-B was not added to the fluoroelastomer (b1). The amount of each material to be compounded and the results of various measurements are shown in Table 1.

Comparative Example 2

A thermoplastic resin composition was obtained by carrying out kneading under the same conditions as in Example 1, except that in the step 1, DBU-B was not added to the fluoroelastomer (b1), and furthermore, that BAPP was added in the step 1 instead of the step 2. The amount of each material to be compounded and the results of various measurements are shown in Table 1.

Example 3

A thermoplastic resin composition was obtained by carrying out kneading under the same conditions as in Example 1, except that the amounts of magnesium oxide and BAPP to be compounded were changed. The amount of each material to be compounded and the results of various measurements are shown in Table 1.

Example 4

A thermoplastic resin composition was obtained by carrying out kneading under the same conditions as in Example 3, except that the amount of BAPP to be compounded was changed. The amount of each material to be compounded and the results of various measurements are shown in Table 1.

Example 5

A thermoplastic resin composition was obtained by carrying out kneading under the same conditions as in
Example 3, except that in the step 1, the fluoroelastomer (b2) was used instead of the fluoroelastomer (b1), that the amount of DBU-B to be compounded was changed, and furthermore, that BAPP was added in the step 1 instead of the step 2. The amount of each material to be compounded and the results of various measurements are shown in Table 1.

Example 6

A thermoplastic resin composition was obtained by carrying out kneading under the same conditions as in Example 5, except that the amount of DBU-B to be compounded was changed. The amount of each material to be compounded and the results of various measurements are shown in Table 1.

TABLE 1

| | Example 1 | Example 2 | Comparative Example 1 | Comparative Example 2 | Example 3 | Example 4 | Example 5 | Example 6 |
|---|---|---|---|---|---|---|---|---|
| Formulation (parts by mass) | | | | | | | | |
| Fluororesin | 80 | 80 | 80 | 80 | 80 | 80 | 80 | 80 |
| Fluoroelastomer (b1) | 18.8 | 18.8 | 18.8 | 18.8 | 18.8 | 18.8 | | |
| Fluoroelastomer (b2) | | | | | | | 18.8 | 18.8 |
| BAPP | 0.6 | 0.6 | 0.6 | 0.6 | 0.8 | 1.6 | 0.8 | 0.8 |
| DBU-B | 0.045 | 0.045 | 0 | 0 | 0.045 | 0.045 | 0.027 | 0.019 |

TABLE 1-continued

|  |  | Example 1 | Example 2 | Comparative Example 1 | Comparative Example 2 | Example 3 | Example 4 | Example 5 | Example 6 |
|---|---|---|---|---|---|---|---|---|---|
| Magnesium oxide | | 0.6 | 0.6 | 0.6 | 0.6 | 0.8 | 0.8 | 0.8 | 0.8 |
| Mass ratio between fluororesin and fluoroelastomer | | 81/19 | 81/19 | 81/19 | 81/19 | 81/19 | 81/19 | 81/19 | 81/19 |
| Volume ratio between fluororesin and fluoroelastomer | | 79/21 | 79/21 | 79/21 | 79/21 | 79/21 | 79/21 | 79/21 | 79/21 |
| Infrared absorption spectrum | | | | | | | | | |
| Ratio [K1] between heights | | 0.037 | 0.008 | 0.036 | 0.036 | 0.033 | 0.035 | 0.033 | 0.042 |
| Ratio [K2] between heights | | 1.84 | 0.86 | 0.17 | 0.12 | 2.25 | 2.58 | 1.90 | 0.53 |
| Physical properties | | | | | | | | | |
| Fuel Permeability Coefficient | (g · mm)/(m² · day) | 1.2 | 1.0 | 1.0 | 0.7 | 1.1 | 1.0 | 1.2 | 1.2 |
| MFR | g/(10 min) | 4 | 8 | 8 | 8 | 4 | 4 | 5 | 5 |
| Tensile elasticity | MPa | 370 | 360 | 387 | 352 | 361 | 367 | 365 | 365 |
| Evaluation of adhesiveness | | good | good | poor | poor | good | good | good | good |

The invention claimed is:

1. A thermoplastic resin composition comprising a fluororesin (A) and a crosslinked fluoroelastomer (B),
   wherein the fluororesin (A) is a copolymer that contains a chlorotrifluoroethylene unit and a tetrafluoroethylene unit and that has at least one functional group selected from the group consisting of a carbonyl group, an olefinic group and an amino group at a main chain terminal or side chain terminal of the polymer, and
   wherein the crosslinked fluoroelastomer (B) is obtained by subjecting a fluoroelastomer (b) to a dynamic crosslinking treatment along with a polyamine compound (c) having a thermal decomposition temperature of 210° C. or higher and a crosslinking accelerator (d) in the presence of the fluororesin (A) under conditions for melting the fluororesin (A),
   the crosslinking accelerator (d) is a quaternary ammonium salt,
   the amount of the polyamine compound (c) is 0.5 to 15 parts by mass based on 100 parts by mass of the fluoroelastomer (b), and
   the amount of the crosslinking accelerator (d) to be compounded is preferably 0.01 to 10 parts by mass based on 100 parts by mass of the fluoroelastomer (b).

2. The thermoplastic resin composition according to claim 1, wherein the fluoroelastomer (b) is a vinylidene fluoride/tetrafluoroethylene/hexafluoropropylene-based fluoroelastomer.

3. The thermoplastic resin composition according to claim 1, wherein the polyamine compound (c) is 2,2-bis[4-(4-aminophenoxy)phenyl]propane.

4. A method for producing the thermoplastic resin composition according to claim 1, comprising:
   subjecting the fluoroelastomer (b) to the dynamic crosslinking treatment along with the polyamine compound (c) having a thermal decomposition temperature of 210° C. or higher and the crosslinking accelerator (d) in the presence of the fluororesin (A) under conditions for melting the fluororesin (A).

5. A molded article formed from the thermoplastic resin composition according to claim 1.

6. A hose or tube for fuel, comprising the molded article according to claim 5.

7. A laminated product comprising a thermoplastic resin layer (W) formed from the thermoplastic resin composition according to claim 1 and an elastomer layer (X) formed from an elastomer composition.

8. The laminated product according to claim 7, wherein the elastomer composition contains at least one elastomer selected from the group consisting of an acrylonitrile-butadiene rubber, a hydrogenated acrylonitrile-butadiene rubber, a blend rubber between an acrylonitrile-butadiene rubber and a polyvinyl chloride, a blend rubber between an acrylonitrile-butadiene rubber and an acrylic rubber, a chlorinated polyethylene, a fluoroelastomer, an epichlorohydrin rubber, an ethylene-propylene rubber, a chlorosulfonated polyethylene rubber, a silicone rubber and an acrylic rubber.

9. The laminated product according to claim 7, wherein the elastomer composition contains at least one compound selected from the group consisting of an onium salt, an amine compound and an epoxy resin.

10. A hose or tube for fuel, comprising the laminated product according to claim 7.

* * * * *